Dec. 23, 1958     E. E. HETTEEN     2,865,416
STRAW CUTTER

Filed Sept. 20, 1954     3 Sheets-Sheet 1

INVENTOR.
EDGAR E. HETTEEN
BY
Paul, Moore & Dugger
ATTORNEYS

INVENTOR.
EDGAR E. HETTEEN
BY
Paul, Moore + Dugger
ATTORNEYS

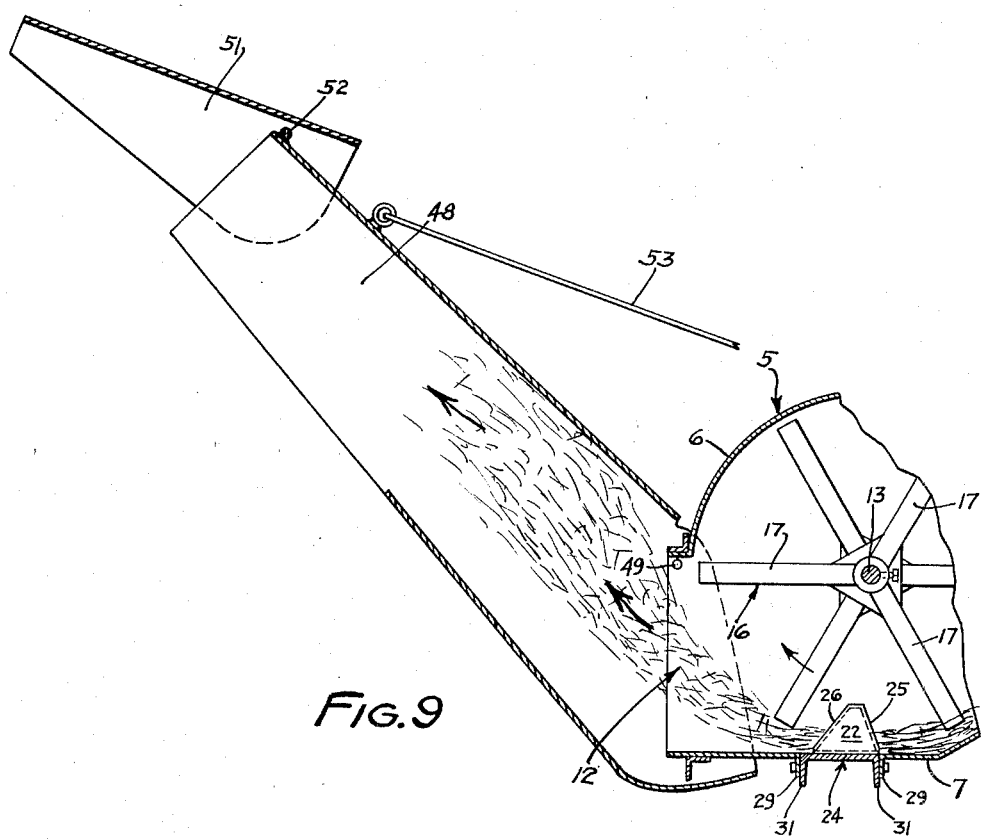
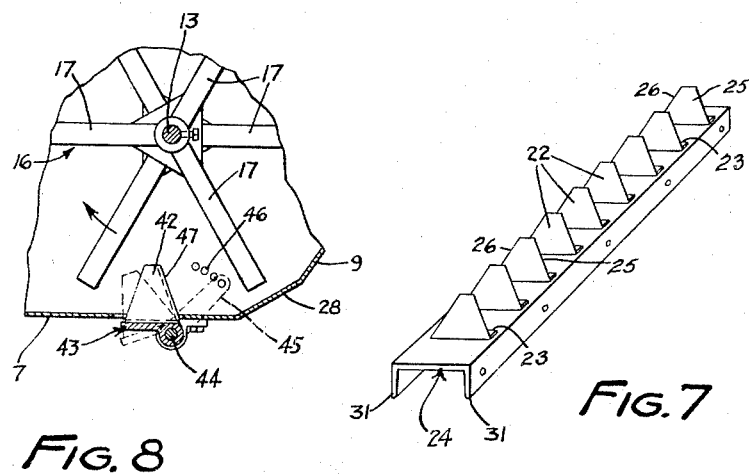

S patent Office
2,865,416
Patented Dec. 23, 1958

2,865,416

STRAW CUTTER

Edgar E. Hetteen, Roseau, Minn.

Application September 20, 1954, Serial No. 456,942

2 Claims. (Cl. 146—117)

This invention relates to new and useful improvements in straw cutters and spreaders for combines and the like, and more particularly to such an apparatus which may be used as an attachment for a conventional combine.

When harvesting grain and other crops with a conventional combine, the straw and chaff is usually discharged from the rear end of the combine onto the ground in the form of a windrow, and may later be gathered in and stacked or baled, if the straw is to be preserved for future use. In recent years it has been discovered that ordinary grain straw, when thoroughly disintegrated and uniformly spread over the surface of the ground and plowed under, may greatly improve the fertility of the soil. Also by intermixing the disintegrated straw with the soil during the plowing operation, the moisture-retaining capacity of the soil is greatly increased whereby the soil may readily absorb heavy rains and thus minimize the loss of soil and moisture by erosion. Numerous attempts have heretofore been made to provide an apparatus for thus disintegrating and spreading the straw discharging from a combine over the surface of the ground, but to the best of my knowledge, none of these have proven entirely satisfactory.

The novel straw cutter and spreader herein disclosed is the result of considerable experimental and research work in an attempt to provide an apparatus of this general type in which all the objectionable features inherent in apparatus of this type now in general use, have been substantially completely eliminated.

An important object of the present invention, therefore, is to provide a straw cutter and spreader in which the rotating and fixed cutting knives or elements are so arranged as to effect thorough and complete disintegration of the straw delivered into said cutter from the discharge passage of the combine, and whereby the straw may be returned to the soil as organic matter, thereby to improve the fertility of the soil.

A further object of the invention is to provide an apparatus for disintegrating straw or other material received from the usual discharge passage of a combine, comprising a closed housing having an intake positioned to receive straw from the combine, and having a plurality of rotary cutter bars or blades mounted for rotation about a transverse axis and cooperating with a plurality of relatively smaller fixed knife elements to thoroughly and completely disintegrate straw and other material delivered into the combine, the cutting edges of said stationary knife elements being so disposed with relation to the rotating knife bars that when the straw is driven thereagainst by said rotating knife bars, it is thoroughly disintegrated into small irregular pieces which may be quickly taken up by the soil in the form of organic matter, an essential constituent in any good crop-growing soil.

A further object of the invention is to provide a straw cutter and spreader attachment for combines comprising a housing having a rotor mounted therein comprising a plurality of radially disposed knife bars or blades adapted to cooperate with a plurality of stationary triangular knife elements having means for adjustably securing them to the bottom wall of the housing, said stationary knife elements having opposed cutting edges which may be selectively moved into cooperating relationship with the cutting edges of said rotary knife bars, thereby to render the apparatus capable of cutting and disintegrating straw and other materials of highly varying characteristics, and means being provided in the discharge opening of said housing for controlling the lateral spread of the material from the apparatus, and whereby such spreading of the material over the ground surface will be substantially uniform.

Another important feature of the invention resides in the inclined disposition of the leading wall of the housing with respect to the rotary knife bars and the discharge passage of the combine, whereby the straw, as it discharges into said housing from the combine, is thrown against said inclined wall by the rotary knife bars and then slides downwardly thereon into engagement with the fixed knife elements at the bottom of the housing, the straw being thrown outwardly against the lower portion of said inclined wall and the bottom wall of the housing by the centrifugal action of the rapidly rotating knife bars, whereby all the straw is subjected to the disintegrating action of the co-acting cutting elements and is thereby reduced to a mass of small irregular pieces which are ejected from the rear end of the housing and spread over the ground surface.

Other objects of the invention reside in the simple and inexpensive construction of the apparatus, whereby it readily lends itself for manufacture in mass production at low cost; in the unique mounting of the fixed knife elements at the bottom of the housing, whereby said knife elements may be relatively adjusted to present a selected cutting edge to the rotary knife bars, thereby to vary the disintegrating action of the cutting elements on the straw; in the specific construction of the triangular stationary knife elements, each of which is provided with opposed cutting edges disposed at different angles with respect to the vertical, whereby reversal of said stationary knife elements with respect to the cutting edges of said rotary knife bars will vary the cutting action of the apparatus, and thus render the apparatus capable of thoroughly disintegrating material or straw of widely varying characteristics; in the supporting means for reversibly supporting the fixed cutting elements, which includes an elongated bar to which said fixed cutting elements are detachably secured, said elongated bar being removably and reversibly secured to the bottom wall of the housing, whereby all said stationary cutting elements may be removed as a unit and reversed, thereby to position the selected cutting edges of said stationary knife elements for cooperation with said rotary knife bars.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 7 is a perspective view of the stationary knife assembly removed from the housing;

Figure 8 is a detail sectional view showing the fixed cutting elements secured to a pivoted support; and Figure 9 is a view showing the rear end of the straw cutter housing provided with a loading spout in lieu of the spreader elements shown in Figure 3, whereby the disintegrated straw may be delivered into a wagon box, or the like.

Figure 1:
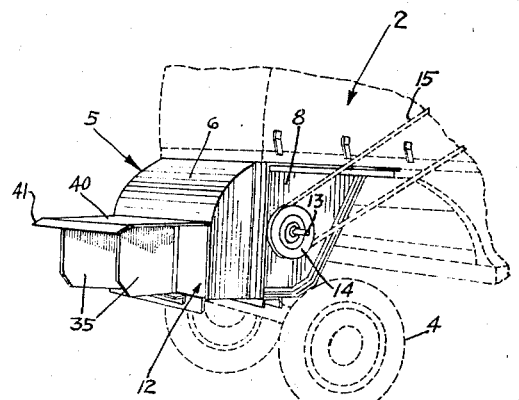
Figure 1 is a view showing in dotted lines, the rear end portion of a conventional combine with the attachment secured in position thereon.
Figure 2:
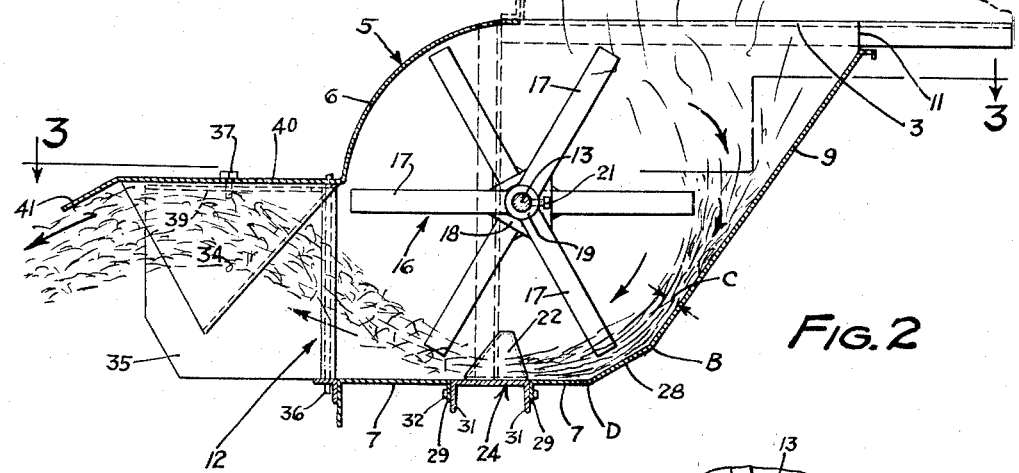
Figure 2 is an enlarged vertical sectional view through the apparatus showing the general arrangement of the various parts thereof.

In the selected embodiment of the invention herein disclosed there is indicated in Figures 1 and 2, for purposes of disclosures, the rear end portion 2 of a conventional combine having a discharge opening 3 through which the combined straw is discharged from the combine, as indicated by the arrows in Figure 2. The rear end portion of the combine is shown supported upon the usual carrying wheels 4.

The novel straw cutter and spreader herein disclosed is shown comprising a housing, generally designated by the numeral 5, comprising a rear curved wall 6, a bottom wall 7, side walls 8, and a forwardly and upwardly extending inclined wall 9, the forward end of which terminates at the forward end 11 of the discharge opening 3 of the combine.

The upper end or top of the housing 5 has an opening therein which registers with the discharge opening 3 of the combine, as clearly illustrated in Figure 2, whereby the straw discharging from the combine may freely enter the housing 5 of the straw cutter and spreader. The housing 5 has a discharge opening 12 at its rear end through which the disintegrated straw is discharged from the housing, as will be understood.

Mounted within the housing is a transverse shaft 13, the end portions of which are supported in suitable bearings 10—10, fixed to the side walls 8—8, as will be understood. A pulley 14 is secured to one end of shaft 13 and has a belt 15 operatively connecting it to a suitable drive pulley of the combine, not shown in the drawings.

Secured to the shaft 13 for direct rotation therewith are a plurality of groups of cutter bars 16. Each such group is shown comprising three radial cutter bars 17, of like construction, having their inner ends fixedly secured to a mounting plate 18. Each mounting plate 18 may be provided with a suitable hub 19 bored to receive the shaft 13. Suitable means, such as set screws 21, are shown mounted in the hubs 19 for fixedly securing the hubs to the shaft 13. If necessary, suitable keys may be provided for securing the hubs 19 against relative rotation upon shaft 13.

Figure 3:
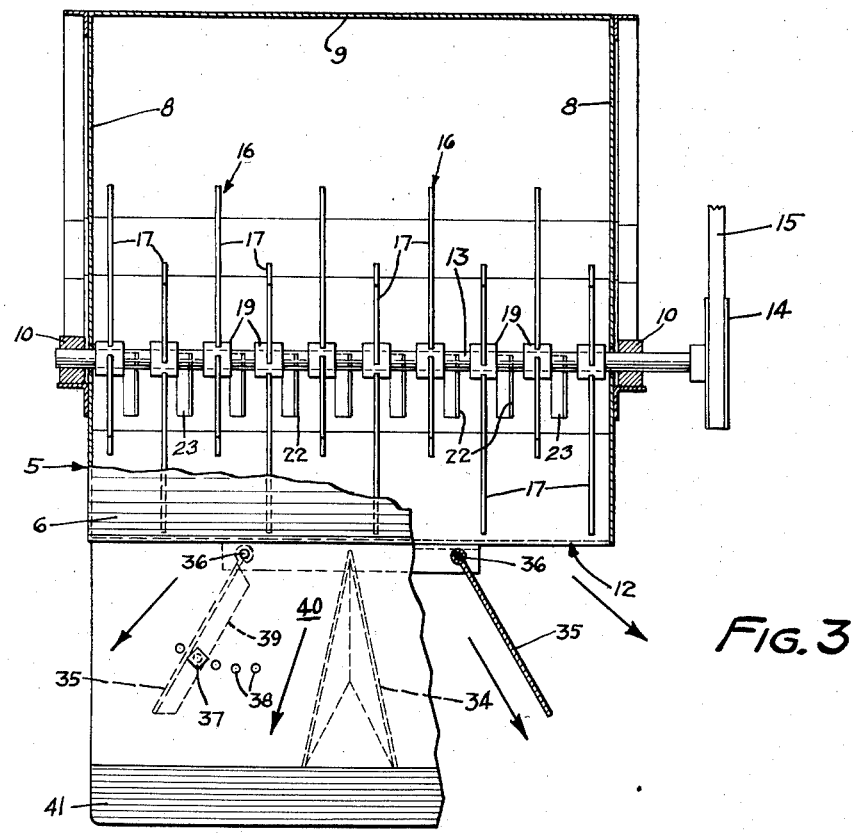
Figure 3 is a sectional plan view substantially on the line 3—3 of Figure 2, showing the means for laterally spreading the disintegrated straw.

The various groups 16 of cutter bars are uniformly spaced apart lengthwise of the shaft, as best illustrated in Figure 3, and the cutter bars of the various groups of cutter bars are disposed in staggered relation, circumferentially, so that the cutter bars are spaced equi-distance apart circumferentially of the shaft, as clearly illustrated in Figure 2.

Mounted directly below shaft 13 are a plurality of stationary knives, generally designated by the numeral 22. The knives 22 are substantially triangular in configuration, and each has a mounting flange 23 at its bottom to facilitate securing the stationary knife blades to a suitable support, such as the channel member 24.

Figure 5:
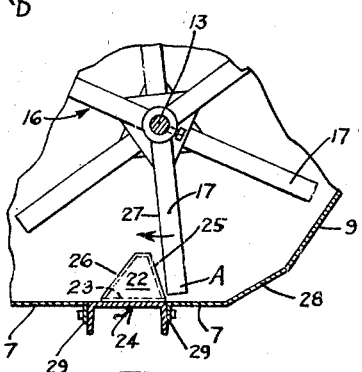
Figure 5 is a fragmentary view showing the triangular stationary knife elements positioned to effect maximum disintegrating action.

An important feature of the invention resides in the unique configuration of the stationary knife blades 22, whereby each such blade is provided with two cutting edges 25 and 26. The cutting edges 25 and 26 are disposed at different angles to the vertical or to the leading edges 27 of the rotary cutter bars 17, thereby to provide two different cutting actions, one for treating straw which may be rather tough and non-brittle, such as straw that may be partially green, or not completely dry, and the other for treating dry, brittle straw which is relatively easier to disintegrate. The relatively straighter cutting edges 25 of the stationary knives 22 are positioned to face the oncoming rotary cutter bars 17, as shown in Figures 2 and 5. Figure 5, in particular, illustrates the slight angle provided between the cutting edges of the fixed knife blades and the rotary cutting bars 17 when the rotary cutter bars 17 reach the position shown at A in Figure 5. Because of the nearly vertical disposition of the cutting edges 25 of the stationary knife blades 22, when the rotary knife blades successively pass therebetween, the straw is driven into engagement with the cutting edges 25 thereof with such force and impact that it is readily cut or torn apart into a mass of small pieces which may readily be discharged from the housing through the discharge 12 of the housing by the rotary action of the rotary knife bars 17.

Figure 6:
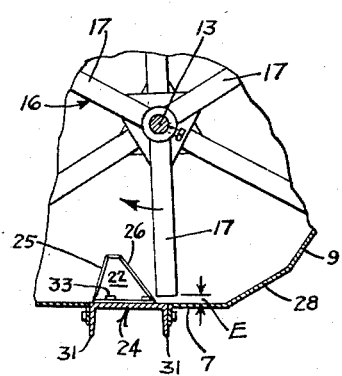
Figure 6 is a view similar to Figure 5, but showing the cutting elements reversed from the position shown Figure 5.

Should the straw be partially green, or not completely dry, whereby it may be more difficult to transversely cut or disintegrate into a plurality of small pieces, the stationary cutter blades are reversed from the position shown in Fig. 5, to that shown in Figure 6, wherein the cutting edges 26 of the stationary knife blades 22 face the oncoming cutting edges of the rotary knife bars 17. Because of the relatively greater angle of the cutting edges 26 of the stationary knife blades 22, the straw is readily disintegrated, or reduced to small bits by a shearing action which minimizes power consumption, and assures substantially full speed of the rotary knife blades at all times, regardless of the character of the straw delivered into housing 5 during operation of the combine.

Figure 4:
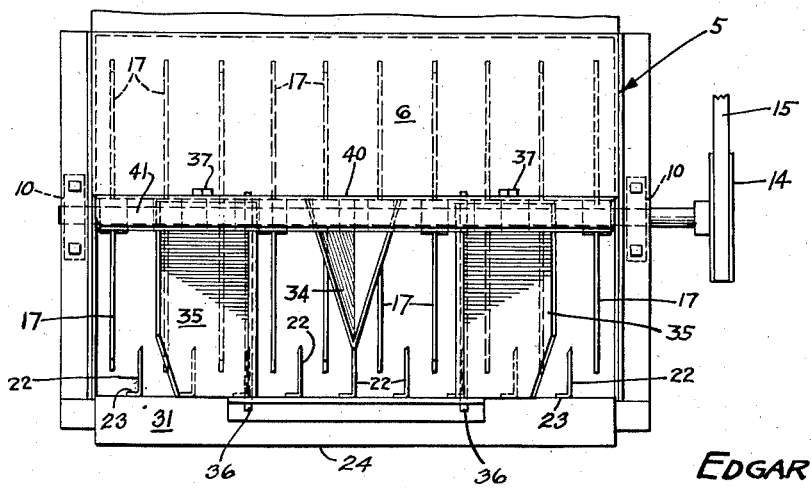
Figure 4 is a rear view of Figure 2.

To facilitate reversing the cutting edges of the stationary knife blades 22, such knife blades are preferably fixedly secured to the channel-shaped supporting bar 24 in longitudinally spaced relation thereon, as indicated in Figure 7. The stationary knife blades are arranged in staggered relation with respect to the rotary cutter bars 17, as best illustrated in Figure 4.

Another important feature of the invention resides in the formation of the forwardly inclined wall 9 of the housing 5. This wall, as hereinbefore stated, has its upper end secured to the body of the combine adjacent to the leading end 11 of the discharge passage 3 of the combine. From the edge 11, the wall 9 extends downwardly and rearwardly to point "B," with its lower portion spaced approximately three-fourths inch from the terminals of the rotary knife bars 17, as indicated at C in Figure 2. Continuing from point "B" of wall 9, is a relatively smaller wall section 28, which has its lower edge merging into the bottom wall 7, as indicated at D.

By reference to Figures 2, 5 and 6, it will be noted that the bottom wall 7 is so related to the axis of shaft 13, that the spacing or clearance "E" between the outer ends of the rotary knife bars 17 and the bottom wall 7 is approximately one-half inch. By thus arranging the rotor within the housing, and particularly with respect to the forwardly inclined wall 9 and the bottom wall 7, maximum disintegrating action of the straw is obtained at all times, regardless of the nature of the straw, as will subsequently be described.

The channel-shaped supporting member 24 to which the fixed knives 22 are connected is shown fitted between a pair of depending flanges 29, shown integrally formed with the bottom wall 7, and to which the opposed flanges 31 of channel bar 24 may be secured by suitable bolts 32, indicated in the application drawings. The stationary knife blades 22 are detachably secured to the supporting bar 24 by such means as bolts 33, whereby they may readily be detached therefrom for sharpening or replacement, as will be understood.

Means is provided in the discharge opening 12 of the straw cutter and spreader housing 5 for laterally and uniformly spreading the disintegrated straw over the surface of the ground as the straw particles are ejected from the housing. Such means is shown comprising a divider 34 secured to a rearwardly extending horizontal wall member 40 having its forward end secured to the lower marginal edge of the curved wall 6 of the housing, as best illustrated in Figure 2. Mounted at each side of the divider 34 is a wing element 35. These elements are mounted for pivotal adjustment about vertical pivot pins 36, supported in the rear supporting structure of the housing 5, as will be readily understood by reference to Figures 2 and 3. The wing elements 35 are secured in fixed adjusted position by suitable bolts 37, selectively receivable in apertures 38 provided in the upper horizontal wall member 40 and in the horizontal flanges 39 of wing elements 35, as clearly illustrated in Figure 3. The wall member 40 is shown having a downwardly extending wall portion 41 for directing the disintegrated straw particles downwardly, as indicated by the arrows in Figure 2.

In Figure 8 the stationary knives 42 are shown mounted upon a pivoted supporting member 43 secured to a shaft 44, shown provided at one end with a crank arm 45. The crank arm is swingable over a plurality of spaced apertures 46 provided in the adjacent side wall 8 of the housing 5, and whereby member 43 may be secured in a selected position by inserting a bolt or pin through the aperture in the crank arm 45 and one of the apertures 46, as will be understood by referring to Figure 8. Pivotal movement of the crank arm 45 will vary the effective cutting edge 47 of the fixed knife blades 42 with respect to the leading edges of the rotary knife bars 17, as indicated by the full and dotted lines in Figure 8. By pivotally mounting the stationary blades 42 as shown in Figure 8, substantially the same cutting and disintegrating effects may be obtained, as is obtainable with the fixed blades shown in Figures 2, 5 and 6, with the exception that in the structure illustrated in Figure 8, the cutting action may be gradually varied from minimum to maximum, by pivotal adjustment of the fixed knives, as will be understood.

In Figure 9, there is shown a structure wherein the means for laterally spreading the straw over the ground surface, such as the wing elements 35 and divider 34, have been eliminated, and in lieu thereof, a conveying spout 48 has its lower end pivotally connected by a pivot 49 to the discharge 12 of the straw cutter housing 5, and is shown provided at its upper end with a hood 51. Hood 51 may be of well-known construction, and is adjustably mounted on the upper end of the spout 48 to control the directional discharge of the disintegrated straw particles from the spout 48.

*Operation*

An important feature of the novel straw cutter and spreader herein disclosed resides in the unique manner in which the straw delivered thereinto from the combine is disintegrated by the rotary and stationary knives and discharged by centrifugal force through the discharge opening 12 over the surface of the ground. The relationship between the forwardly inclined and bottom walls 9, 28 and 7, the rotary blades 17, and the stationary blades 22, plays an important part in the successful and highly efficient operation of the apparatus.

By reference to Figure 2, it will be noted that the outer ends of the rotary blades 17 are spaced relatively close to the inclined wall portions 9 and 28, as they pass thereby. Actual experience has shown that by spacing the tips of the rotary blades 17 approximately three-fourths inch from the wall portions 9 and 28, and spacing said tips approximately one-half inch from the bottom wall 7 of the housing, maximum results are obtained. In operation, the straw is engaged and picked up by the rapidly rotating blades 17, and thrown forwardly against the inclined wall 9, as indicated by the arrows in Figure 2. The straw thus thrown against wall 9 becomes compacted thereagainst and gradually slides downwardly on said wall to the bottom of the housing, as indicated at C. The straw is thus delivered to the stationary blades 22 in the form of a rather thin blanket extending over the width of the bottom wall. When the straw engages the stationary knives or blades 22, the tips of the rotary blades 17 in passing between the fixed blades 22, drive the straw against the cutting edges of the blades 22 and thus thoroughly disintegrate the straw. The disintegrated straw is then thrown outwardly through the discharge opening 12 of the housing 5 by the centrifugal action of the rotary blades 17, as indicated by the arrows in Figure 2.

By forcing the straw against the forwardly inclined wall members 9 and 28, the feeding of the straw against the stationary blades 22 may be accurately controlled to assure uniform and efficient operation of the apparatus with a minimum of power, and with the assurance that the straw cannot accumulate in the rotor between the blades 16 and thus interfere with the operation of the apparatus, as is common with numerous straw cutters and spreaders now in use.

The dual edged stationary blades 22 make it possible to quickly adapt the apparatus for handling or disintegrating straws of widely varying characteristics. For example, when treating straw which is considered relatively difficult to thoroughly disintegrate, and which may tend to overload the rotor and thereby reduce its speed, the cutting edges 26 of the stationary knives 22 are used because of their relatively greater angle with respect to the cutting edges of the rotary knife bars 17.

The disintegration of the straw is effected by the centrifugal force created by the rapidly rotating knife blades 17, which as hereinbefore stated, drives the straw against the lower portions of the cutting edges 26 of the fixed knife blades 22, so long as the rotor operates at full speed. Should the rotor become overloaded and lose speed, the centrifugal action of the rotor blades on the straw correspondingly decreases, whereby the straw may slide up on the cutting edges 26 of the stationary blades 22 and over the top thereof without being disintegrated, whereby the overloaded condition of the rotor is automatically relieved. The speed of the rotor thereupon returns to normal with the result the speed of the rotor is again restored to its normal operation.

When operating with straw that is relatively less difficult to disintegrate, the stationary knives 22 are reversed from the position shown in Figures 2 and 5 to that shown in Figure 6, whereby the cutting edges 25 are engaged by the straw, as the ends of the rotating blades 17 pass between the stationary knives 22.

The apparatus, as a whole, is comparatively simple and inexpensive in construction, and may be driven directly from the cylinder shaft of the combine or from any other source of power. It is made large enough to readily handle the maximum amount of straw which can be discharged from the combine with which it is used, whereby there is little or no danger of the straw cutter and spreader becoming overloaded or clogged with straw, and thus rendered inoperative. In other words, the construction of the apparatus, including the wall portions 9, 28 and 7, and the relationship between said walls and the rotary and stationary knives 17 and 22, is such that the movement of the straw as it passes from the combine into the housing 5 of the straw cutter, is continuous and uninterrupted, and the disintegrated straw is spread uniformly over the surface of the ground. The disintegrated straw may thereafter be plowed under and returned to the soil as organic matter, thereby to improve the fertility of the soil and its moisture-absorbing qualities.

In some instances, it may be desired not to spread the disintegrated straw over the surface of the soil. Under such conditions, the straw spreading elements of the apparartus, including the horizontal wall portion 40 and spreader elements 34 and 35, may be detached from the straw cutter housing 5, and in lieu thereof, a discharge spout 48, shown in Figure 9, may then be substituted therefor. The discharge spout 48 is preferably pivotally mounted on the housing 5, as indicated at 49, whereby its upper end portion may be vertically adjusted to adapt it for delivering the disintegrated straw into truck bodies of different heights, or into some other receiving means. A hood 51 is shown pivoted to the upper end of spout 48 and is also pivotally mounted on the spout, as indicated at 52, thereby to control the delivery or directional flow of the material from the spout 48, as will be understood.

The width of the receiving end of the discharge spout 48 is preferably equal to the width of the discharge opening 12 of housing 5, whereby the disintegrated straw chips thrown outwardly through the discharge opening 12 by the rotary action of the blades 17 may pass directly into the discharge spout 48 the width of the discharge opening 12. The opposed side walls of the spout 48 gradually taper inwardly towards its discharge end, thereby to confine the material discharging from the spout 48 to a restricted flow which may more readily be directed into remote corners of a truck body or box. If desired, means may be provided for vertically adjusting the discharge end of the spout 48, as indicated at 53 in Figure 9.

The foregoing detailed description has been given for clearness of understanding only, and no unnecessary limitations should be understood therefrom, but the appended claims should be construed as broadly as permissible in view of the prior art.

I claim as my invention:

1. In a straw cutter and spreader for combines, a housing comprising a front inclined wall and side, top and bottom walls, and having an intake opening at its upper end and a discharge opening at its rear end, means for securing said housing to a combine with its intake opening in communication with the straw discharge opening of the combine, a shaft extending transversely through said housing and having its end portions rotatably mounted in the side walls of the housing, means for driving said shaft, a plurality of rotary cutter bars secured to said shaft in spaced relation along its length, said cutter bars extending radially from said shaft and having their outer terminals disposed in close proximity to said bottom wall, as they pass thereover, said bottom wall having an elongated opening therein disposed in parallel relation to said shaft and extending the width of the housing, an elongated member normally closing said opening and constituting a portion of said bottom wall, a plurality of fixed knife elements secured to said elongated member and having their cutting edges extending upwardly therefrom into cutting relation with said rotary cutter bars directly below said shaft, means for detachably securing said elongated member in operative position in the bottom wall of the housing, said rotary cutter bars engaging the straw delivered into said housing from the combine and driving it into cutting engagement with said stationary knife elements and simultaneously sweeping the disintegrated straw from the bottom wall of the housing out through the discharge opening thereof, and said stationary cutting elements having oppositely disposed cutting edges, the cutting edges at one side of said elements being disposed at a relatively greater angle to the vertical than the cutting edges at the opposite side thereof, whereby reversal of said fixed knife elements in said housing will vary the cutting characteristics of said fixed and rotary cutting elements upon the straw delivered into the housing from the combine.

2. In a straw cutter and spreader for combines, a housing comprising a front inclined wall and side, top and bottom walls, and having an intake opening at its upper end and a discharge opening at its rear end, means for securing said housing to a combine with its intake opening in communication with the straw discharge opening of the combine, a shaft extending transversely through said housing and having its end portions rotatably mounted in the side walls of the housing, means for driving said shaft, a plurality of rotary cutter bars secured to said shaft in spaced relation along its length, said cutter bars extending radially from said shaft and having their outer terminals disposed in close proximity to said bottom wall, as they pass thereover, said bottom wall having an elongated opening therein disposed in parallel relation to said shaft and extending the width of the housing, an elongated member normally closing said opening and constituting a portion of said bottom wall, a plurality of fixed knife elements secured to said elongated member and having their cutting edges extending upwardly therefrom into cutting relation with said rotary cutter bars directly below said shaft, means for detachably securing said elongated member in operative position in the bottom wall of the housing, said rotary cutter bars engaging the straw delivered into said housing from the combine and driving it into cutting engagement with said stationary knife elements and simultaneously sweeping the disintegrated straw from the bottom wall of the housing out through the discharge opening thereof, and said stationary cutting elements having oppositely disposed cutting edges, the cutting edges at one side of said elements being disposed at a relatively greater angle to the vertical than the cutting edges at the opposite side thereof, whereby reversal of said fixed knife elements in said housing will vary the cutting characteristics of said fixed and rotary cutting elements upon the straw delivered into the housing from the combine, the elongated member to which said fixed knife elements are secured being reversible in the opening in said bottom wall, thereby to selectively present two different sets of cutting edges to said rotary cutter bars.

References Cited in the file of this patent

UNITED STATES PATENTS

| | | |
|---|---|---|
| 949,173 | Ellis | Feb. 15, 1910 |
| 1,120,721 | Jensen | Dec. 15, 1914 |
| 1,191,853 | Thompson | July 18, 1916 |
| 2,281,846 | Klein | May 5, 1942 |
| 2,493,918 | Hill | Jan. 10, 1950 |
| 2,554,669 | Elofson | May 29, 1951 |
| 2,670,775 | Elofson | Mar. 2, 1954 |
| 2,681,091 | Buboltz | June 15, 1954 |
| 2,708,582 | Adams | May 17, 1955 |
| 2,754,126 | Aune | July 10, 1956 |